127,115

UNITED STATES PATENT OFFICE.

ISAAC L. STANLEY, OF NEW YORK, N. Y., ASSIGNOR TO THE AMERICAN SARDINE COMPANY, OF SAME PLACE.

IMPROVEMENT IN PROCESSES FOR PREPARING FISH FOR FOOD.

Specification forming part of Letters Patent No. 127,115, dated May 21, 1872.

Specification describing an Improved Process of Preparing Fish for Food, invented by ISAAC L. STANLEY, of the city, county, and State of New York.

This invention has for its object the softening of the bones of menhaden and other fish, and preparing said fish for food.

To this end, I first put the fish, after being dressed and prepared—that is, cleaned externally and internally—into open tin or other suitable boxes or vessels, and place the same in a steam-chest, which is afterward closed. In this condition I steam the fish with steam of 212° Fahrenheit, or thereabout, for five hours, more or less, after which they are taken out of the steam-chest and put on tables to cool and drain for about five or six hours. The fish are then packed in tin boxes of a suitable size for the market, and the boxes filled with olive or other oil, and the boxes afterward closed and the covers soldered or sealed. Said boxes containing the fish are next put into a tank or chest, which is afterward closed, and heated by steam or otherwise to a temperature of from 217° to 220° Fahrenheit, or thereabout, for a period of from two to five hours, according to the size of the fish or its bones.

This constitutes a very cheap and efficient process of softening the bones of fish and preparing the latter for food without the use of vinegar and spices, which are very objectionable to many people and injurious to others.

Claim.

I claim as my invention—

The process of preparing fish for food by successive steamings, combined with an intervening cooling, without the use of vinegar or other condiments, substantially as described.

ISAAC L. STANLEY.

Witnesses:
FRED. HAYNES,
R. E. RABEAU.